358-84. OR 2,903,508 SR

SEARCH ROOM

Sept. 8, 1959 J. L. HATHAWAY 2,903,508

AUDIENCE SURVEY SYSTEM

Filed July 1, 1955 3 Sheets-Sheet 1

INVENTOR.
JARRETT L. HATHAWAY
BY [signature]
ATTORNEY

T502?
Rm

INVENTOR.
JARRETT L. HATHAWAY
BY
[signature]
ATTORNEY

INVENTOR.
JARRETT L. HATHAWAY
BY
[signature]
ATTORNEY

United States Patent Office 2,903,508

Patented Sept. 8, 1959

2,903,508

AUDIENCE SURVEY SYSTEM

Jarrett L. Hathaway, Manhasset, N.Y., assignor to Radio Corporation of America, a corporation of Delaware Application July 1, 1955, Serial No. 519,604

9 Claims. (Cl. 178—6)

The present invention relates to a novel audience survey system and, particularly, to a system useful in conducting a survey of television receivers for determining to which television broadcast channel receivers are tuned at a given time, whereby, for example, an index of the relative popularity of specific programs may be afforded.

In view of the desire of broadcasters, advertisers and the like to maintain a check on the popularity of programs and broadcast stations, there have been proposed, in the past, several systems for conducting audience surveys. Certain proposals have depended upon the detection of electric waves radiated by the local heterodyne oscillators of home receivers, thus being subject to error by reason of the fact that different receiver makes operate with different intermediate frequencies and, therefore, different local oscillator frequencies. Other proposals have been found to constitute a source of annoyance to the public, in that they depend upon telephone inquiries or upon mechanical counting and recording devices installed in the receiver locations. Other known arrangements, while technically feasible, are rather expensive to employ.

It is, therefore, a primary obect of the present invention to provide a novel television audience survey system which is relatively inexpensive and which is not a source of inconvenience or annoyance to the audience.

Another object of the invention is that of providing an audience survey system whose components are mobile, so that the system is substantially without geographic limitation.

A further object of the invention is to provide means determining which of several television stations is being received at a given location.

In general, the present invention affects the foregoing and other aims through the agency of means which may, for example, be located in a mobile unit, for receiving energy radiated by the horizontal deflection circuits of television broadcast receivers and means for comparing the phase of such received energy with the phase of the horizontal synchronizing information transmitted by one or more of the broadcasting stations in the area, one or more television receivers being located in the mobile unit for detecting the horizontal synchronizing signals of the broadcasters. Since the deflection circuitry of a given receiver is synchronized by sync pulses transmitted by the station to which that receiver is tuned, it will be understood that, with the different transmitters in a given area operating on differently phased synchronizing generators, the phase of the deflection energy in a given receiver will follow the synchronizing information of the transmitter to which the receiver is tuned. Means may additionally be employed for indicating the station or channel to which a receiver is tuned, as detected in accordance with the arrangement described.

As will be appreciated, therefore, the audience survey system of the present invention involves relatively simple apparatus and is capable, in accordance with one form of the invention, of determining which receivers in an area are tuned to respective ones of the different broadcasting stations serving that area. In the event that tuning in certain channels occurs without authorization, as in a system of "paid television," this invention could be employed to detect "pirating."

Additional obects and advantages of the present invention will become apparent to those skilled in the art from a study of the following detailed description of the accompanying drawing, in which.

Figure 4A:
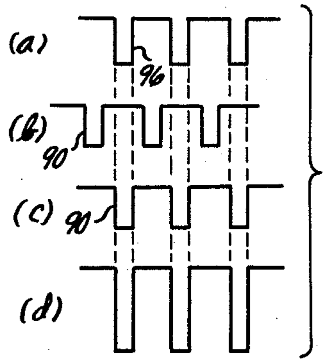
Fig. 4 is a schematic diagram of apparatus for performing the phase comparison function alluded to briefly above and to be described more fully hereinafter.
Figure 5:
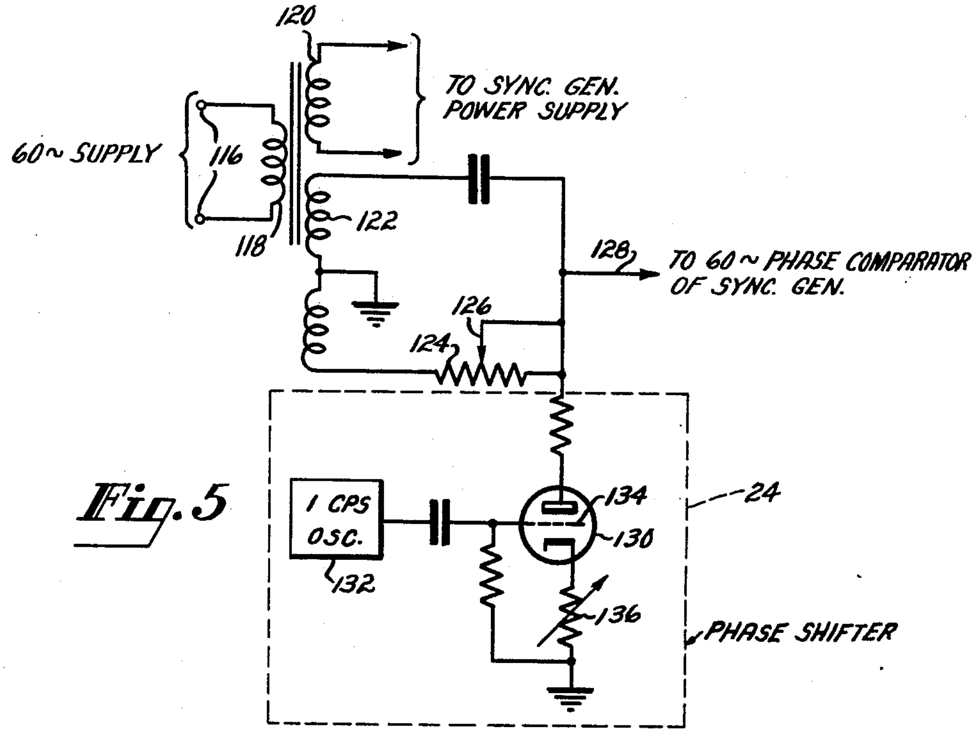
Figure 6:
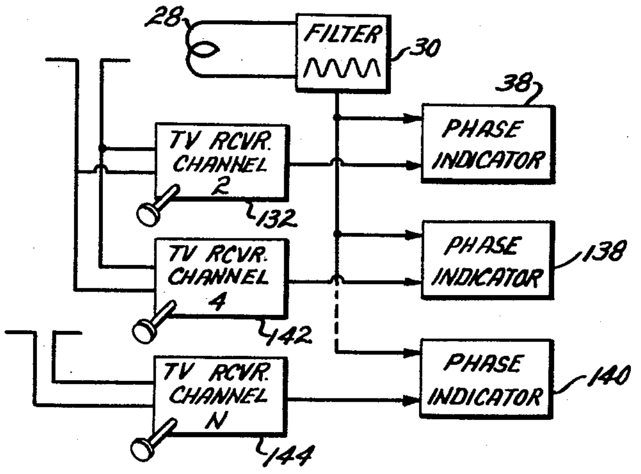

Fig. 4*a* illustrates a series of waveforms to be described in connection with the apparatus of Fig. 4;

Fig. 5 is a schematic diagram of a portion of the circuitry of a typical television transmitter synchronizing generator together with means for varying the phase of its signals; and Fig. 6 is a block diagram illustrative of an embodiment of the invention capable of surveying a plurality of television broadcast stations.

Figure 1:
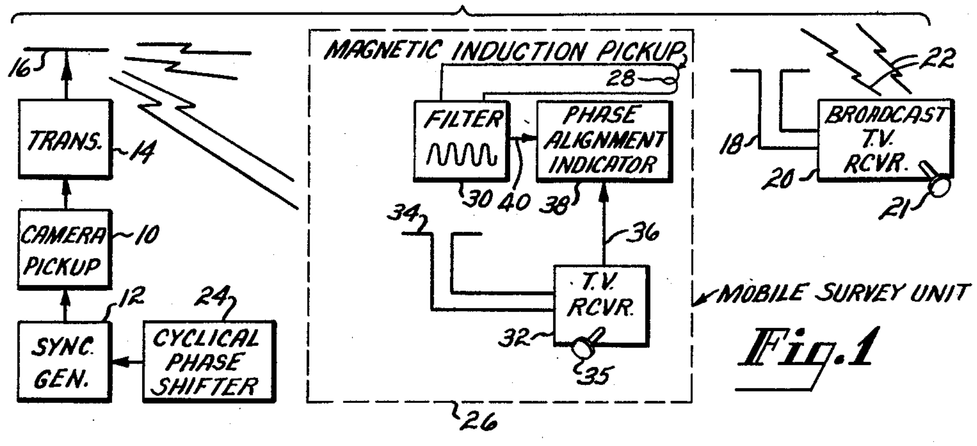
Fig. 1 illustrates, by way of a block diagram, a television transmitter, a receiver and a mobile arrangement in accordance with the invention.

Referring to the drawing, Fig. 1 illustrates the usual components of a television broadcast transmitter station. An image pickup device 10 which may, for example, comprise a conventional image scanning camera such as the Iconoscope is caused to scan an image (not shown) in a line-by-line and field-by-field fashion under the control of a synchronizing generator 12 which provides composite synchronizing signals including horizontal (e.g., 15.75 kc.s.) and vertical (e.g., 60 c.p.s.) frequency synchronizing pulses. The synchronizing signals from the generator 12 are combined with the video or image signals provided by the pickup arrangement 10 and the composite video and synchronizing signals are employed in amplitude-modulating a radio frequency carrier wave in a transmitter 14 which applies the carrier to an antenna 16 for radiation.

The waves radiated by the transmitter antenna 16 are intercepted by the antenna 18 of a broadcast television receiver 20 which, if tuned to the frequency of the transmitted carrier wave, performs various amplification and detection processes upon the received waves to derive therefrom the original video signals which are conventionally employed in modulating the intensity of a scanning electron beam in a kinescope. The synchronizing signals of horizontal and vertical frequencies are separated from the composite video signals and are used to synchronize the receiver's beam-deflection circuits so that they operate in synchronism with the scanning at the transmitter. As is known, conventional broadcast receiver deflection arrangements of the type used in home television receivers include flyback power supplies which involve the production of relatively high amplitude pulses occuring at the horizontal deflection frequency. Energy of that frequency and its harmonics is thus unavoidably radiated by the receiver, and with substantial intensity, as indicated by the jagged lines 22 in Fig. 1. Moreover, and as will be understood by those skilled in the art, the usual home television broadcast receiver includes a horizontal deflection oscillator phase control or "Horizontal Hold" control 21 for facilitating the locking-in of the receiver deflection circuits with the received synchronizing signals. That is, the frequency and the phase of the receiver horizontal deflection oscillator may be manually varied, where necessary, to permit the oscillator to be locked into synchronism with the received sync information.

As thus far described, the transmitter-receiver arrangement shown in Fig. 1 is conventional and, therefore, does not require additional description. It will be noted that the transmitter sync generator is, as shown in Fig. 1, also provided with a continuous phase shifter control 24, to be described more fully hereinafter. At this point, it is sufficient to note that the phase shifter 24 may be any suitable apparatus capable of cyclically varying the phase of the horizontal deflection synchronizing pulses produced by the sync generator over a predetermined range and at a relatively slow rate. Thus, for example, the phase shifter 24 may comprise an arrangement for varying the phase of the sync generator over a range of say 90° at horizontal deflection frequency of 15.75 kc.s. per second at the rate of 90° phase shift per second. By reason of the action of the phase shifter 24, therefore, it will be understood that the horizontal synchronizing pulses transmitted by the station represented in Fig. 1 will cyclically shift in phase, so that a broadcast receiver 20 tuned to that channel will follow the varying phase of the horizontal synchronizing signals, by reason of the fact that the receiver circuits are locked in with the received signals. Thus, the horizontal deflection energy radiated by the receiver 20 in the usual manner will correspondingly or synchronously vary in phase. This fact is exploited in accordance with the present invention in such manner as to provide, at a point within the effective radiation region of the receiver, an indication of whether the receiver is tuned to a specific transmitter channel, assuming that other channel transmitters are shifting at different rates or perhaps are not shifting.

Such indication is provided through the agency of the apparatus included within the dotted line rectangle 26 which is designated "mobile survey unit." The apparatus of the mobile survey unit may be carried by a motor vehicle such as a truck of suitable size. Those elements which comprise the mobile survey unit are, first, means such as a magnetic induction pickup loop antenna 28 capable of intercepting the radiating energy from a television receiver such as that indicated by reference numeral 20 and applying the received energy to a tuned filter 30 or other frequency selective device. The antenna 28 may be a simple loop, properly oriented.

As has been stated, the deflection energy radiated by such a receiver includes the fundamental horizontal deflection frequency of 15.75 kc.s. and its harmonics with various degrees of intensity. Thus, the filter 30 may preferably have a multiple pass band characteristic whose response peaks occur, respectively, at harmonics of the horizontal deflection frequency. With the mobile survey unit 26 of the present invention located within receiving range of the radiated deflection energy of a given television receiver, the phase of the received energy is indicative of the television broadcast channel to which the receiver is tuned. In order to determine whether a given receiver is tuned to a specific channel such, for example, as the channel assigned to the transmitter 14 in Fig. 1, the mobile survey unit further includes a television receiver 32 whose receiving antenna 34 intercepts the waves transmitted by the antenna 16. The horizontal deflection circuitry within the receiver 32 of the survey unit is thus operated in synchronism with the deflection signals transmitted by the antenna 16, control thereof being afforded by a phase control 35. In accordance with the invention, therefore, the horizontal sync pulses produced in the receiver 32 are selected, as in its sync separating circuit, and applied via a lead 36 to one input terminal of a "phase alignment indicator" which receives, at its second input terminal 40, pulses produced by the filter 30 from the energy radiated by the receiver 20 being surveyed and intercepted by the magnetic induction pickup antenna 28. The phase alignment indicator 38 includes suitable circuitry for comparing the phase of the horizontal sync pulses from the receiver 32 with the pulses at the output of the filter 30 and suitable means for indicating whether the two sets of pulses are in phase. Thus, when the phase of pulses from receiver 32 is adjusted by control 35 for continuous alignment with pulses from filter 30, the same station is being received. It should be understood that the phase adjustment could equally well be incorporated with filter 30 rather than receiver 32 if desired. It will be understood, from the foregoing, that if the two sets of pulses applied to the phase alignment indicator 38 are in phase and remain in phase, despite the continuous shift introduced at the transmitter by the phase shifter 24, the broadcast receiver 20 is tuned to the frequency of transmitter 14. Thus, in accordance with the form of invention shown in Fig. 1, if one were interested in the number of receivers in a given area tuned in to a specific channel, that information would be readily available in the following manner: with the mobile unit 26 driven down a street in the area with the receiver 32 tuned to the channel under investigation, the phase alignment indicator 38 would provide an indication at the location of each broadcast receiver in operation and tuned to the same transmitter channel. Hence, it will be appreciated that, as the truck containing the survey unit passed each house along the street, the indicator 38 would provide an indication if a receiver in that house were tuned to the frequency of the transmitter 14 under test. By reason of the fact that the phase of horizontal sync pulses provided by the generator 12 of the transmitter is continuously varied, only those receivers tuned to that transmitter frequency would radiate deflection energy whose phase followed that of the transmitter.

While in the specific example set forth in connection with the showing of Fig. 1, means are provided for positively and automatically varying the phase of the transmitted synchronizing information, it should be borne in mind that, in many instances, a television transmitter sync generator which is operated from the local 60 c.p.s. power mains has a certain amount of phase variation in normal operation. Thus, a positive phase shifter may, in some instances be unnecessary, as where a plurality of broadcasting stations in a large city are operated from different 60 c.p.s. supplies.

Figure 2:
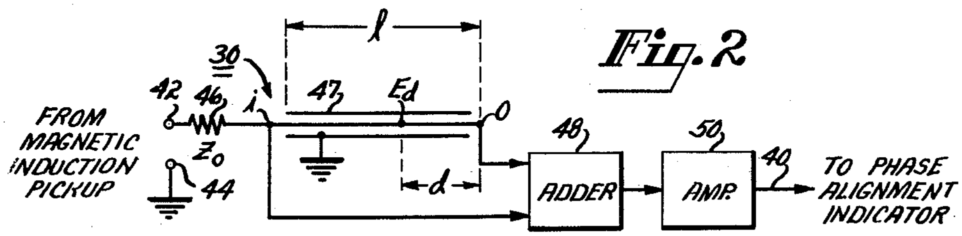
Fig. 2 is a schematic diagram of circuitry suitable for performing certain of the functions indicated in Fig. 1.
Figure 4:
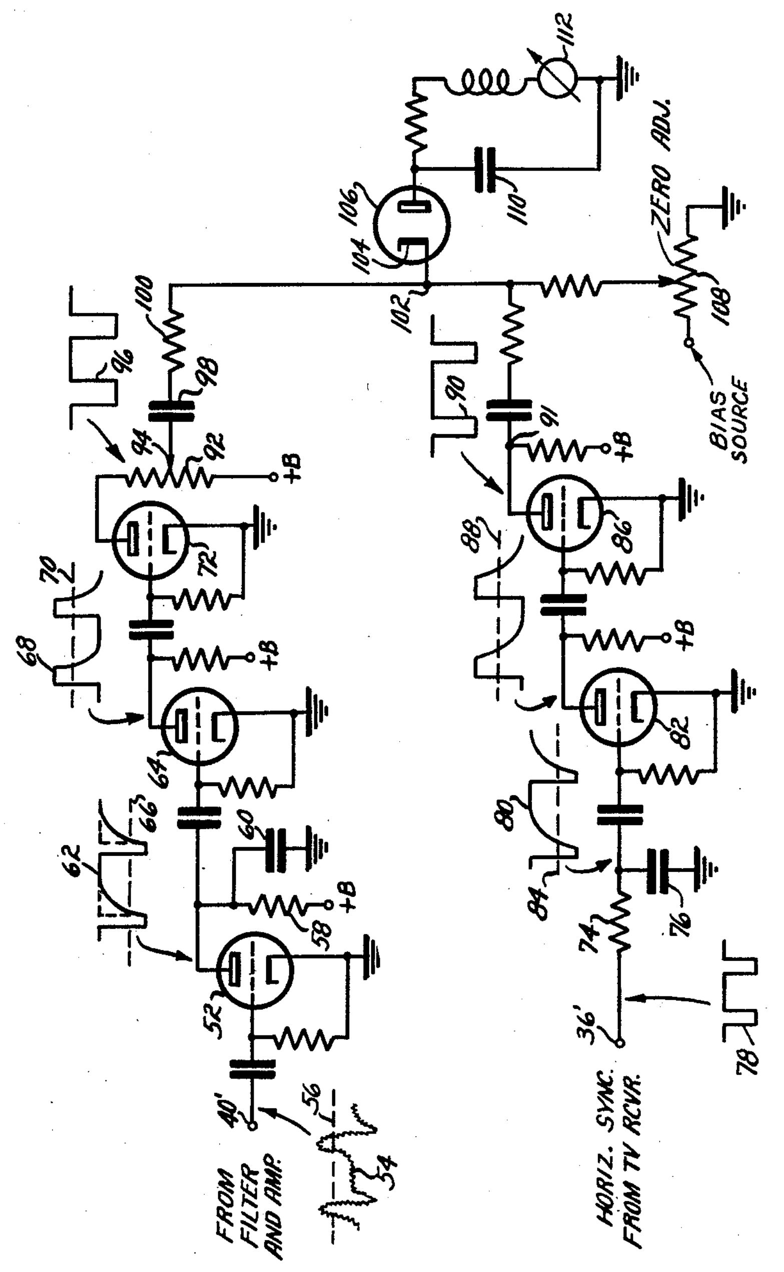

In the interest of completeness of description, Figs. 2 and 4 illustrate schematically circuits capable of performing the functions, respectively, of the multiple pass band filter 30 and phase alignment indicator 38. Fig. 2 shows a "comb" filter whose consecutive passband "teeth" occur at the horizontal deflection frequency of 15.75 kc.s. and its harmonics. Specifically, the input terminals 42, 44 of the filter are connected to the source of electrical signals which, as shown in Fig. 1, comprises the magnetic induction pickup 28 and, if desired, suitable amplifier stages. The signals from the pickup are applied via a resistor 46 to one end of a transmission line 47. The impedance of the resistor 46 is chosen such that the transmission line 47 is terminated at its winding or input end "$i$" in its characteristic impedance $Z_0$. The receiving or output end "$o$" of the transmission line 47 is open, or unterminated. It may be noted that the line 47 may be an actual transmission line or its artificial equivalent in lumped constants. The signals appearing at the input end "$i$" of the transmission line 47 are combined with the signals appearing at the output end "$o$" in an adder 48.

Assuming, in Fig. 2, that the transmission line 47 is of length "$l$" and is coupled to a signal generator (i.e., the magnetic induction pickup) which provides a generator voltage $E_G$, a standard formula for the voltage at a point on the transmission line a given distance "$d$" from the output end of the line is:

$$E_d=E_G e^{-j\omega l\sqrt{LC}} \cos \omega d\sqrt{LC}$$

where $\omega=2\pi$ times the signal frequency and "L" and "C" are the line constants.

Hence, the voltage at the input end of the line is $$E_i = E_G e^{-j\omega l\sqrt{LC}} \cos \omega l\sqrt{LC}$$

The term $\omega l\sqrt{LC}$ shows that the phase is proportional to signal frequency and the term $E_G \cos \omega l\sqrt{LC}$ shows that the amplitude of response varies sinusoidally with signal frequency. Where "$l$" is chosen to equal $$\frac{1}{f_0\sqrt{LC}}$$

the amplitude factor is cos $$2\pi\frac{f}{f_0}$$

and the period of the sinusoidal response variation is $f_0$.

Figure 3:
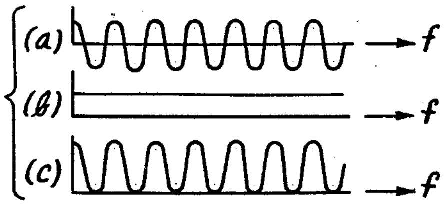
Fig. 3 illustrates a series of frequency response characteristics to be described in connection with the circuit of Fig. 2.

A plot of such a frequency response characteristic is illustrated by a curve *a* of Fig. 3. The voltage amplitude at the open output end of the transmission line is, however, substantially independent of frequency, as illustrated by curve *b* of Fig. 3. By combining the signals from the input and output ends of the line 47 in the adder 48, an output signal is obtained which obeys a frequency response characteristic which is substantially the sum of the characteristics of Figs. 3(*a*) and 3(*b*) and which is illustrated by curve *c* of Fig. 3. With $f_0$ equal to the horizontal frequency of the television system (15.75 kc.s.), there is provided a comb filter whose response is peaked at the deflection frequency and its harmonics. If desired, the output signal of the adder 48 in Fig. 2 may be passed through a band pass filter, so that only the received harmonics having appreciable amplitude, such as for example the 5th thru the 25th of the deflection frequency are used. The signals thus selected are or may be amplified in one or more stages indicated by the amplifier 50 before application via the lead 40 to the phase alignment indicator 38. It should be understood also that if some degree of receiving sensitivity can be sacrificed, the comb filter arrangement may be replaced by a simple band pass filter—say 100–500 kc.

Fig. 4 illustrates one suitable arrangement for performing the phase alignment indication function of the block 38 in Fig. 1. In Fig. 4, the deflection energy signals picked up by the mobile unit's antenna and passed through its filter 30 is applied to an input terminal 40' of a conventional clipper stage 52. The signal from the filter will have a somewhat mutilated appearance (as compared with a synchronizing pulse of rectangular wave shape) such as is shown by the waveform 54 adjacent to the terminal 40'. The clipper stage 52 is so biased as to clip the signal 54 along the level shown by the dotted line 56 and includes, in circuit with its anode load resistor 58, a pulse-broadening capacitor 60, so that the output waveform of the clipper 52 has generally the shape shown at 62 in solid lines. The dotted line portion of the waveform 62 indicates the appearance the pulse would have in the absence of the pulse-broadening capacitor 60. The reason for broadening the pulse is that the time duration of the received impulse is rather short and would render operation of the apparatus critical. The amplified and clipped waveform 62 is applied to a second clipper stage 64 which is biased to clip the signal along the level 66 to provide a waveform 68 which is, in turn, clipped along the level 70 in a similar clipping circuit 72.

Simultaneously with the foregoing, the horizontal sync pulses detected in the receiver 32 of the survey unit and separated from the remainder of the composite television signal are applied to the input terminal 36' of an integrating circuit or pulse broadening circuit comprising a series resistor 74 and shunt capacitor 76. Thus, the horizontal sync pulses 78 are shaped by the integrating circuit so that they appear as shown at 80. The broadened pulses 80 are passed through a clipper stage 82 which is biased to clip the signal along the level 84 and the resultant, clipped signal is applied to a second sync pulse clipper stage 86 which clips the signal along the level 88 to provide the output pulses 90 at the terminal 91.

As will be noted, the output circuit of the clipper stage 72 includes a variation signal takeoff circuit in the form of a potentiometer 92 having an adjustable tap 94. Thus, the amplitude of the pulse derived from the clipper 72 and shown by the waveform 96 may be adjusted to equal the amplitude of the pulses 90. The pulses 96 are applied via a coupling capacitor 98 and isolating resistor 100 to an output terminal 102. The horizontal sync pulses 90 are similarly applied to the terminal 102, which terminal is connected to the cathode 104 of a diode 106 which is statically biased from a source 108 so that it conducts only when the pulses 96 and 90 occur substantially in time coincidence. That is, the pulses 96 derived from the radiated energy from the receiver being surveyed are shown in waveform *a* of Fig. 4*a* and the pulses 90 are shown on the same time scale in waveform *b* of that figure. When the pulses 90 and 96 appearing at the terminal 102 occur as shown in waveforms *a* and *b* of Fig. 4*a* (i.e., out of phase), the diode 106 does not conduct, by reason of the bias applied to its cathode. When, on the other hand, the receiver being surveyed is tuned to the same transmitter as that to which the survey receiver 32 is tuned, so that the transmitted sync pulses detected by the receiver 32 are of the same phase as the deflection energy radiated by the receiver 20, the pulses 90 will be of the phase shown by waveform *c* of Fig. 4*a*, that is, in substantial time coincidence with the pulses 96. The resultant waveform at the terminal 102 is the sum of the pulses 96 and 90, as shown by waveform *d* of Fig. 4*a*, the amplitude of the resultant pulse being sufficiently great to render the diode 106 conductive, so that current may flow through its anode-cathode circuit which includes a filter capacitor 110 and an indicating device illustrated as a current meter 112. The filter capacity is of such size relative to the impedance of the metering circuit as to cause "averaging" of the pulse currents through the meter. Thus, when pulses 96 and 90 are in phase only momentarily only a very low meter indication will result. It will thus be noted that the apparatus of Fig. 4 provides a substantial indication via the meter 112 only when a receiver being surveyed is tuned to the same frequency as the transmitter to which the mobile unit receiver is tuned. While the indicating means may, as shown, be a simple meter, it may also, if desired, include a counting mechanism of suitable variety. It may alternatively, if desired, be replaced by a cathode ray oscilloscope. As a further alternative, phase alignment may be recorded for subsequent utilization such as counting.

It should be noted that, to prevent deflection energy from the receiver 32 in the mobile unit from disturbing the action of the phase alignment indicator, the deflection circuits in the receiver should be carefully shielded or even turned off during the surveying of receivers.

Although the present invention does not depend for its operation upon the use of any particular type of transmitter sync generator, there is illustrated in Fig. 5, in the interest of completeness of description, an arrangement which may be employed in adapting one commercially used sync generator for operation with continuous varying phase. That is to say, that portion of Fig. 5 which is included within the dotted line rectangle 24 comprises a continuous phase shifter which may be connected, substantially as shown, to a sync generator of the type described and illustrated in a book entitled "TG–1A Studio Synchronizing Generator" published by the Radio Corporation of America. The sync generator in question is powered from the 60 c.p.s. mains as indicated by the terminals 116 which are connected to the primary winding 118 of a power transformer. One secondary winding 120 of the transformer is connected to the sync generator power supply rectifier, while a second secondary winding 122 provides energy of 60 c.p.s. and of a certain phase with respect to the phase of the energy at the terminals 116 to the phase comparator circuit (not shown) of the sync generator. That is to say, the sync generator in question includes a source of 31.5 kc.s. wave which is divided down in several steps to produce the vertical synchronizing frequency 60 c.p.s. The latter wave is applied to a phase comparator along with a wave from the transformer winding 122 to control a reactance device associated with the source of 31.5 kc.s. wave, thereby maintaining the sync generator locked in with the power supply. The commercial sync generator also includes a phase control in the form of a resistor 124 variable in size through the agency of an adjustable tap 126. In operation, as the tap 126 is moved along the resistor 124, the phase of the wave applied to the lead 128 for application to the phase comparator is shifted in one direction or the other, depending upon the direction of movement of the slider tap.

Since the 60 c.p.s. wave in the lead 128 is, in effect, multiplied by a factor of 262.5 to produce the horizontal deflection wave, a small phase shift in the 60 c.p.s. wave results in a rather large phase shift of the horizontal frequency wave. Thus, the continuous wave shafter 24 may comprise simply a device for variably shunting the resistor 124 whereby to shift the phase of the wave at the lead 128 in varying amounts. The conduction of the shunting tube 130 is controlled by an oscillator 132 which may, for example, provide one cycle per second of sine wave variation to the control electrode 134 of the shunting tube. The bias of the tube may be set by a variable resistor 136 in its cathode circuit, so that approximately ⅓ of 1° of phase shift is produced at 60 c.p.s. Since the phase shift is cyclically and continuously varied, it will be seen that the horizontal sync pulses produced by the associated generator will correspondingly vary.

While the arrangement of Fig. 1, as described, is useful in checking whether a given receiver is tuned to a given television channel, the principles of the present invention may also be employed in making a survey of wider scope. Thus, in the embodiment of the invention shown in Fig. 6, wherein reference numerals identical to those used in Fig. 1 indicate corresponding elements, means are provided in the form of a mobile survey unit for determining what channel a given receiver in an area is tuned to accept. The apparatus of Fig. 6 includes a magnetic induction antenna 28 for applying deflection energy received from nearby television receivers to a filter 30 whose output signal is applied simultaneously to a plurality of phase alignment indicators 38, 138 and 140. As shown, there may be a phase alignment indicator for each television channel operating in the area. Similarly, the mobile survey unit includes a first television receiver 132, a second television receiver 142 tuned to another channel and an Nth receiver 144. Each of the receivers is tuned to a different television channel and provides to one of the phase alignment indicators the separated horizontal synchronizing pulses derived in that receiver from signals transmitted in the channel to which it is tuned.

In operation with the arrangement of Fig. 6, as the mobile survey unit passes within range of a television broadcast receiver tuned to one of the television channels represented by the receivers 132, 142, and 144, an indication will be provided by one of the devices 38, 138 or 140, respectively. Again, as in the case of the apparatus of Fig. 1, the phase alignment indicators may include counting mechanisms, so that a record may be made of the number of receivers found to be tuned to the specific television channel under consideration.

Having thus described my invention, what I claim as new and desire to claim by Letters Patent is:

1. An audience survey system for use in determining whether a television receiver of the type which includes deflection circuitry operable in synchronism with synchronizing signals received from a transmitter is tuned to a given television channel including such a transmitter, said system comprising: a source of signals bearing a fixed phase relative to the synchronizing signals transmitted in such channel by said transmitter; magnetic induction pick up means for receiving deflection frequency energy produced by such television receiver; and means connected to the output of said source and to said pick-up means for comparing the phase of such energy with the phase of such signals which bear a fixed relation to the transmitted synchronizing signals.

2. An audience survey system for use in determining whether a television receiver is tuned to a given television channel having a source of scanning synchronizing signals for synchronizing a receiver tuned to its frequency, said system comprising: a source of reference signals bearing a fixed phase relation to the synchronizing signals of said channel; means including a magnetic induction pick-up for receiving scanning frequency energy impulses produced by such television receiver; means connected to said source and to said receiving means for comparing the phase of such received energy impulses with the phase of such reference signals; and means connected to said phase comparing means and responsive to the phase relation of such received energy impulses to such reference signals for indicating when such energy impulses bear a fixed relation to such reference signals.

3. An audience survey system which comprises a television receiver for receiving transmitted television signals including synchronizing signals, said receiver including means for separating said synchronizing signals from said television signals, a second television receiver for receiving transmitted television signals, means for receiving radiated deflection energy from said second television receiver, means connected to the output of said receiving means and responsive to said deflection energy to produce pulses of television deflection repetition rate therefrom, means coupled to the separating means of said first mentioned receiver and to said pulse producing means to compare the phase of said pulses with said synchronizing signals, and means connected to and operated by said phase comparing means to indicate the phase relation of said pulses and said synchronizing signals.

4. An audience survey system for use in determining whether a television receiver is tuned to a given television channel having means for transmitting scanning synchronizing signals for synchronizing the deflection circuits of a receiver tuned to such channel, said system comprising means for receiving television signals from said channel and including means for separating said synchronizing signals from said television signals, a television receiver, pick up means arranged to receive radiated deflection energy from said last-mentioned television receiver, means connected to said pick up means and responsive to said deflection energy to produce pulses of television deflection repetition rate therefrom, means connected to the separating means of said first-mentioned receiving means and to said pulse producing means to compare the phase of said pulses with said separated synchronizing signals, and means connected to and operated by said phase comparing means to indicate the phase relation of said pulses to said synchronizing signals.

5. An audience survey system for use in determining whether a television receiver is tuned to a given television channel having means for transmitting scanning synchronizing signals for synchronizing the deflection circuits of a receiver tuned to such channel, said system comprising means for receiving television signals from said channel and including means to separate said synchronizing signals from said received television signals, a television receiver, pick up means arranged to receive radiated deflection energy and harmonics thereof from said last-mentioned television receiver, a frequency-selective circuit connected to said pick-up means and responsive to said last-mentioned deflection energy and certain of its harmonics to produce pulses of television deflection repetition rate therefrom, means coupled to said frequency-selective circuit and to the separating means of said first-mentioned receiving means to compare the phase of said pulses with said separated synchronizing signals, and means connected to and operated by said phase comparing means to indicate the phase relation of said pulses to said synchronizing signals.

6. An audience survey system which comprises a television receiver for receiving transmitted television signals including synchronizing signals, said receiver including means for separating said synchronizing signals from said television signals, a second television receiver, means for receiving radiated deflection energy from said second television receiver, an electrical filter of the multiple passband type whose passbands are centered respectively at multiples of the television deflection frequency connected to said receiving means and responsive to said deflection energy to produce pulses of television deflection repetition rate therefrom, means coupled to said filter and to the separating means of said first-mentioned television receiver to compare the phase of said pulses with said synchronizing signals, and means connected to and operated by said phase comparing means to indicate the phase relation of said pulses to said synchronizing signals.

7. Audience survey apparatus for determining to which of a plurality of channels a given television receiver is tuned, which system includes means in each channel for transmitting scanning deflection synchronizing signals for synchronizing the scanning deflection circuit of receivers tuned to and operating upon television signals from that channel, which apparatus comprises: a plurality of television signal receiving means, one for each of such channels, each of said signal receiving means having means for detecting and separating the synchronizing signals from the signals received from such channel; means for receiving scanning deflection energy radiated by a television receiver under investigation, means connected to said last-mentioned receiving means and responsive to said scanning deflection energy for deriving from such energy pulses corresponding in time to the deflection signals in said last-mentioned receiver; and means connected to said pulse deriving means and to the detecting and separating means of said plurality of television signal receiving means for comparing the phase of said derived pulses with the synchronizing signals detected by each of said plurality of television signal receiving means.

8. Audience survey apparatus for determining to which of a plurality of channels a given television receiver is tuned, which system includes means in each channel for transmitting scanning deflection synchronizing signals for synchronizing the scanning deflection circuit of receivers tuned to and operating upon television signals from that channel, which apparatus comprises: a plurality of television signal receiving means, one for each of such channels, each of said signal receiving means having means for detecting and separating the synchronizing signals from the signals received from such channel; means for receiving scanning deflection energy radiated by a television receiver under investigation, means connected to said last-mentioned receiving means and responsive to said scanning deflection energy to derive from such energy pulses corresponding in time to the deflection signals in said last-mentioned receiver, means connected to said pulse deriving means and to the detecting and separating means of said plurality of television signal receiving means to compare the phase of said derived pulses with the synchronizing signals detected by each of said plurality of television signal receiving means; and means connected to and operated by said phase comparing means to indicate the one of such channels whose detected synchronizing signals have a fixed phase relation to said pulses derived from said radiated energy.

9. Audience survey apparatus for use in determining whether a given television receiver is tuned to a certain television channel which includes means for transmitting scanning deflection synchronizing signals for synchronizing the deflection circuits of receivers tuned to that channel, which apparatus comprises: means associated with such synchronizing signal transmitting means for cyclically varying the phase of the synchronizing signals, which it transmits; means for receiving television signals from such channel and for separating such synchronizing signals therefrom; means for receiving radiated energy from a television receiver, means connected to said last-mentioned receiving means and responsive to said received radiated energy for producing pulses of television deflection repetition rate therefrom; and means operatively coupled to said last-named means and to said television signal receiving means for comparing the phase of said pulses with said separated synchronizing signals.

References Cited in the file of this patent

UNITED STATES PATENTS

| | | |
|---|---|---|
| 2,419,525 | Alford | Apr. 29, 1947 |
| 2,471,530 | Lobel | May 31, 1949 |
| 2,552,585 | Rahmel | May 15, 1951 |
| 2,584,599 | Luck | Feb. 5, 1952 |
| 2,742,638 | Haywood | Apr. 17, 1956 |
| 2,751,429 | Schlesinger | June 19, 1956 |